Feb. 6, 1934.  G. B. SAMUELS  1,946,000
STOCK RACK
Filed Jan. 16, 1933  2 Sheets-Sheet 1

George B. Samuels
Inventor

Feb. 6, 1934.    G. B. SAMUELS    1,946,000
STOCK RACK
Filed Jan. 16, 1933    2 Sheets-Sheet 2
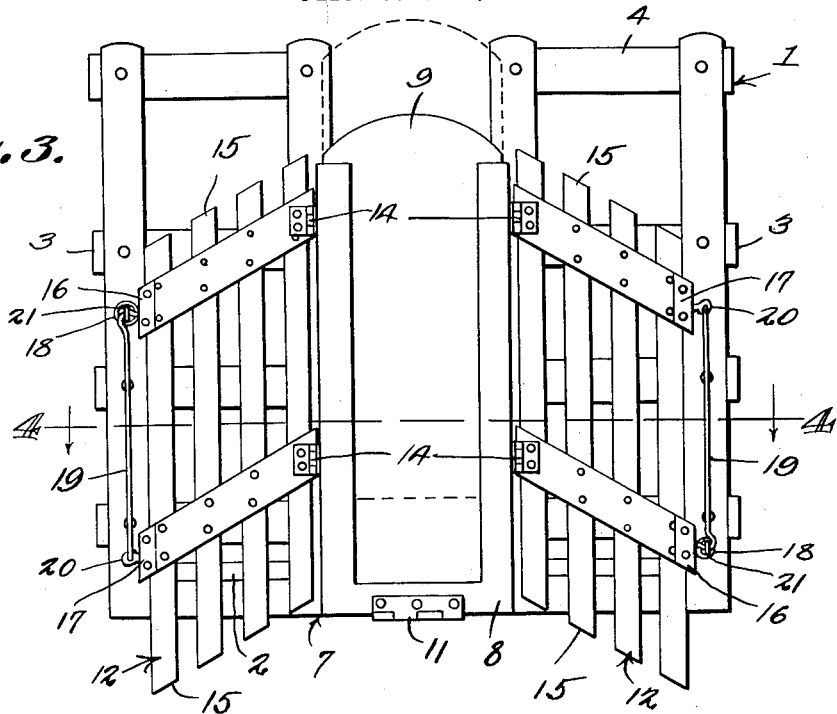
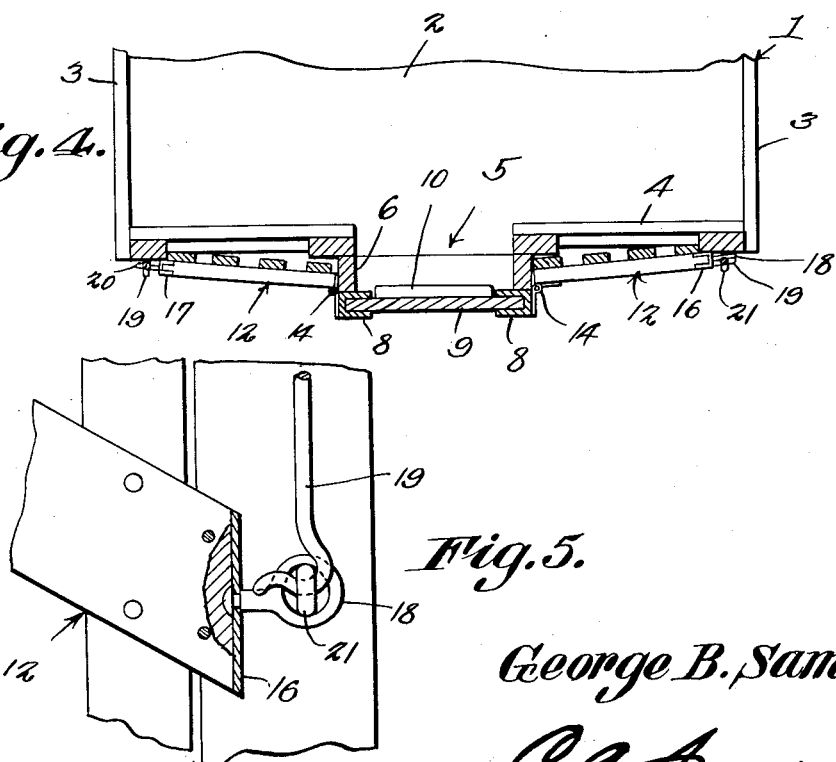
George B. Samuels
Inventor Patented Feb. 6, 1934

1,946,000

UNITED STATES PATENT OFFICE 1,946,000

STOCK RACK

George B. Samuels, Burlington, Kans.

Application January 16, 1933. Serial No. 652,086

2 Claims. (Cl. 296—61)

This invention aims to provide a novel folding chute which may be attached to a vehicle, for the purpose of loading or unloading stock, novel means being provided for opening the rear end wall of the vehicle partially, at the will of an operator, and novel means being provided for holding the chute in inoperative position against the rear end wall of the vehicle.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 3 is an end elevation showing the chute opened and folded upwardly against the rear end wall of the vehicle;

Fig. 4 is a section on the line 4—4 of Fig. 3;

Fig. 5 is an elevation enlarged from Fig. 3, parts being broken away, and parts being in section.

Figure 1:
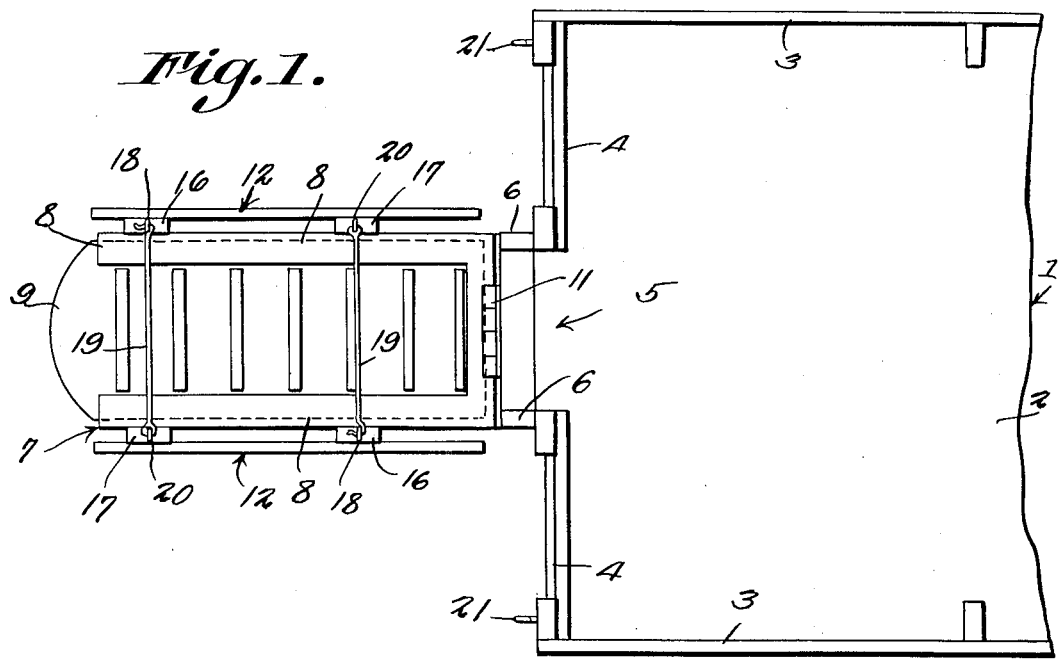
Fig. 1 shows, in top plan, a truck body equipped with the chute forming the subject matter of this application, the chute being in the position which it will assume when in use.

The numeral 1 marks a truck body including a bottom 2, sides 3, and an end member 4 having an opening 5 extended downwardly from the upper edge of the end member to the bottom or floor 2.

An outstanding U-shaped frame 6 is secured to the end member 4, about the opening 5, and since the frame 6 is U-shaped, it may be said to have an opening also.

A chute is provided, and includes a base 7. The base 7 is a composite structure, comprising a guide frame 8 which, when viewed in elevation, as in Fig. 3, is U-shaped. Figure 4 shows that, in cross section, the constituent parts of the frame 8 are channel members.

Figure 2:
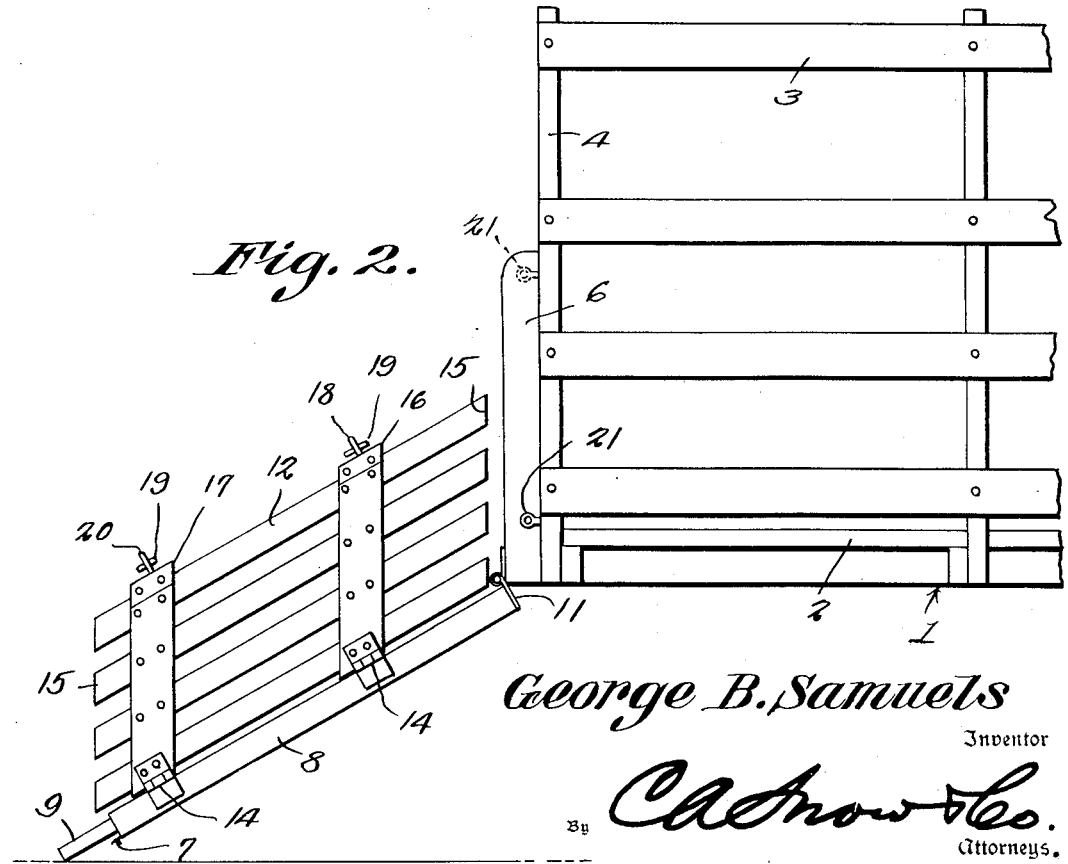
Fig. 2 is a side elevation of the structure shown in Fig. 1.

A slide 9 is mounted to reciprocate (under certain conditions) in the frame 8, and has transverse cleats 10 which form a foot hold for the animals, when, as shown in Figs. 1 and 2, the slide 9 constitutes the tread portion of the chute. A hinge 11 unites the end bar of the frame 8 of the base 7 to the lower part of the frame 6, at the lower end of the opening 5, the construction being such that the base 7 can have a vertical up-and-down swinging movement, between the operative position of Fig. 2, and the inoperative position of Fig. 3. With the parts in the position of Fig. 3, the upper edge of the end bar of the U-shaped frame 8 is substantially flush with the upper surface of the floor 2, whereby the dirt can be conveniently swept out, after the slide 9 has been raised.

Wings 12 are connected at their lower ends, by hinges 14, with the side members of the frame 8 of the base 7. The ends 15 of the wings 12 are cut off at an angle other than a right angle, with respect to the length of the wings 12, so that when the chute is in working position, as shown in Fig. 2, there will be no gap between the upper ends of the wings and the adjacent part of the wagon body.

Anchors 16, preferably made of metal, are mounted on the outer edges of the wings 12, and the other anchors 17 are similarly mounted on the wings. Figure 1 shows that the anchors 16 are disposed in diagonally opposite relation with respect to each other, and the same observation holds true with respect to the anchors 17 or, stated differently, the anchor 16 on one wing is directly opposite to the anchor 17 on the other wing.

First keepers 18, in the form of eyes, are journaled in the anchors 16. Connections 19, such as hooks, are carried by pivot elements 20, journaled in the anchors 17. Second keepers 21 project rearwardly from the end member 4 of the truck body 1. The second keepers 21 are small enough so that the first keepers 18 can pass over them, under conditions which will be described hereinafter, reference being had especially, at this point, to Fig. 5.

When the device is used to unload stock, the parts are arranged as shown in Fig. 2 and in Fig. 1, the lower end of the slide 9 resting on the ground. The reason for having the lower end of the slide 9, rather than some part of the frame 8, rest on the ground, is to prevent the slide from reciprocating in the frame 8 as the animals walk down the slide 9, the cleats 10 affording a foot hold upon the slide. The wings 12 are erected to form the sides of the chute, when the base 7 is in the inclined position of Fig. 2. The hooks or connections 19 are engaged with the first keepers 18, as shown in Fig. 1, and the chute is ready for use.

When the occasion for the chute has passed, the hooks 19 can be cast off the first keepers 18. The base 7 is swung upwardly on the hinge 11 into parallelism with the end wall 4 of the vehicle, as shown in Fig. 3. The wings 12 are folded outwardly, into parallelism with the end member or wall 4, on the hinges 14. The keepers 21 on the end member 4 pass through the keepers 18 on the wings 12, and the hooks 19 are engaged with the keepers 21, outwardly of the keepers 18, to hold the chute in the flattened-out and upstanding position of Fig. 3.

When the parts are arranged as shown in Fig. 3, the slide 9 forms a closure for the opening 5 in the rear end of the vehicle body 1, but the slide can be slid upwardly in the member 8, to give access to the vehicle body. The slide 9 has several functions, in that it constitutes the tread of the runway at times (Fig. 2), and at other times (Fig. 3) forms a vertically-movable closure for the opening 5, capable of being operated to open and close the opening 5 whilst the runway is in the upturned and inoperative position of Fig. 3, the slide also acting as a stiffener for the U-shaped member 8. When the slide 9 is in the position of Fig. 2, it can be pulled out a little, thereby creating an opening in the runway at the upper end of the slide 9. The dirt swept out of the body 1 will drop through the said opening, instead of lodging on the slide 9.

Having thus described the invention, what is claimed is:

1. A vehicle comprising a wall having an opening, a chute including a base, hinge means carrying one end of the base at the lower end of the opening, wings hinged to the base, means for maintaining the wings erected to form the sides of the chute when the base is in an inclined position, the last-specified means comprising a connection on each wing, and a first keeper on the opposite wing, wherewith the connection is releasably engaged, and second keepers on said wall of the vehicle, the connection engaging the second keepers, and the first keepers being received upon the second keepers, between the connections and the vehicle wall, when the base is swung upwardly into approximate parallelism with said wall and when the wings are swung outwardly into approximate parallelism to said wall.

2. In a device of the class described, a vehicle body having an opening in its end, and including a floor, a chute including a U-shaped base embodying side members and an end bar, the end bar being hinged to the vehicle body at the lower end of the opening, wings hinged to the side members of the base, means for maintaining the wings erected to form the sides of the chute when the base is in an inclined position, and a slide mounted to reciprocate in the U-shaped base and forming an internal stiffening and strengthening means therefor, the slide constituting the tread portion of the base when the base is in an inclined position, the upper edge of the end bar of the base being substantially flush with the upper surface of the floor, when the base is in an upturned position, whereby when the slide is raised, the vehicle body will be opened down to the bottom, to give convenient access to the vehicle body, and to facilitate cleaning out of the vehicle body, the slide being outwardly movable in the base, when the base is in an inclined position, thereby to create an opening in the base, adjacent to the end bar, the dirt removed from the vehicle body then dropping through the last-specified opening without lodging on the slide and in the chute.

GEORGE B. SAMUELS.